P. E. HAWKINSON.
PROCESS AND APPARATUS FOR VULCANIZING TIRES.
APPLICATION FILED JAN. 27, 1921.
1,397,209.
Patented Nov. 15, 1921.
2 SHEETS—SHEET 1.
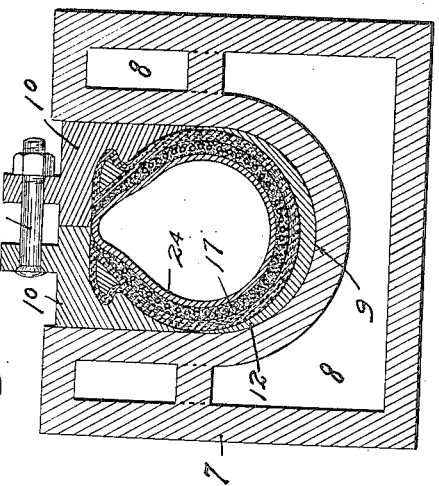
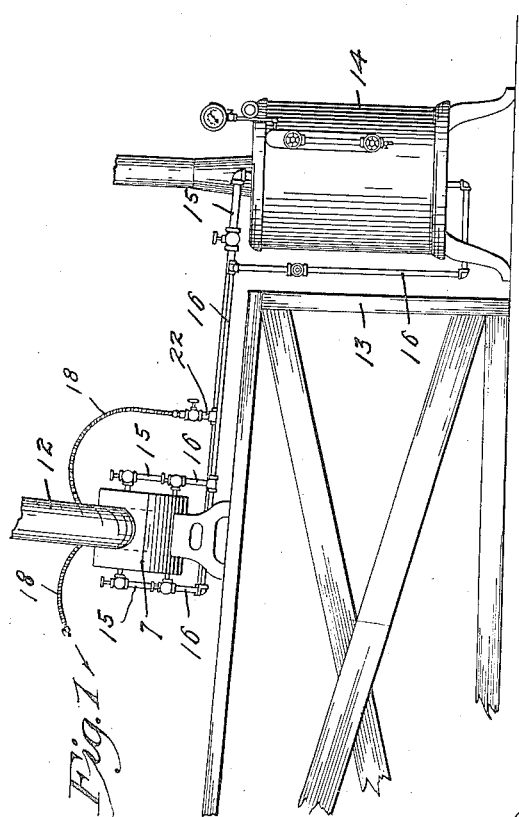
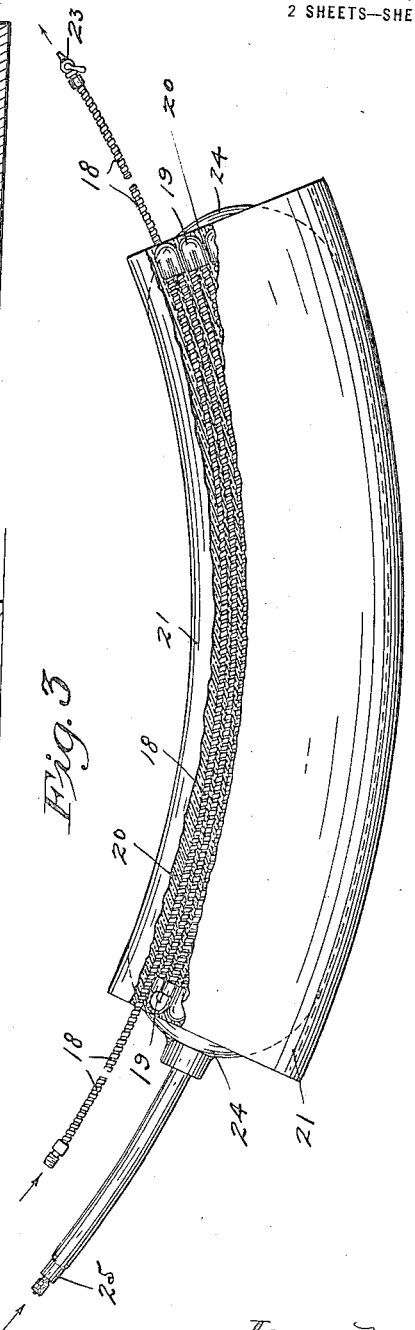
Inventor
Paul E. Hawkinson
By his Attorneys
Merchant, Kilgore & Kilgore P. E. HAWKINSON.
PROCESS AND APPARATUS FOR VULCANIZING TIRES.
APPLICATION FILED JAN. 27, 1921.
1,397,209.
Patented Nov. 15, 1921.
2 SHEETS—SHEET 2.
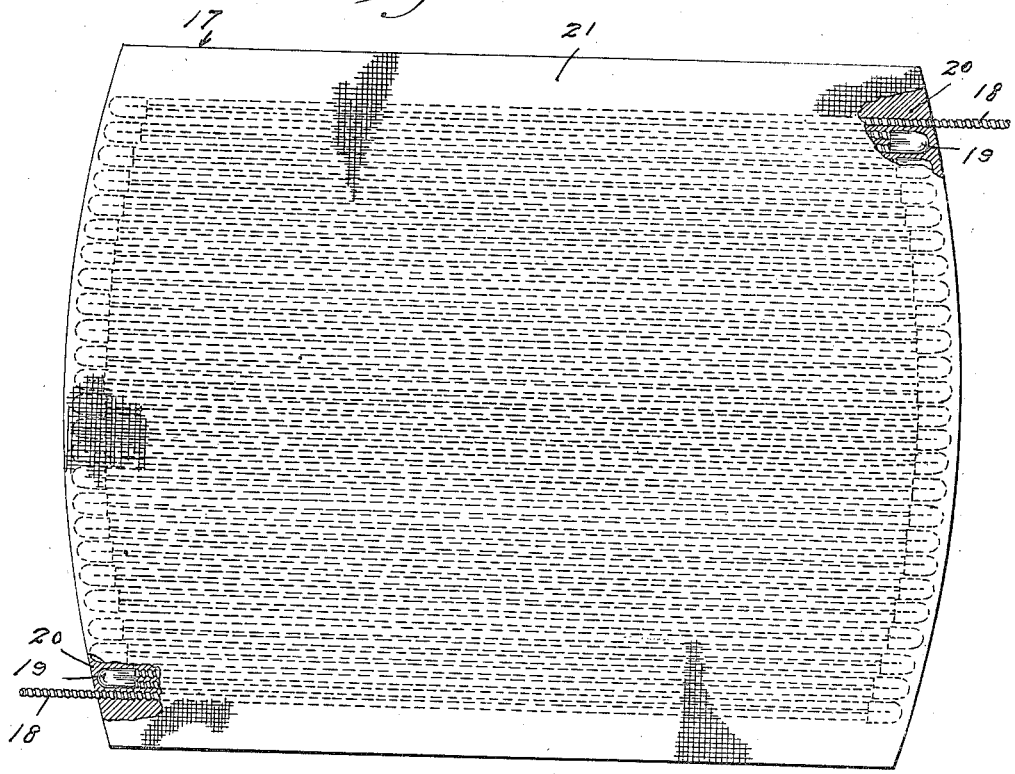
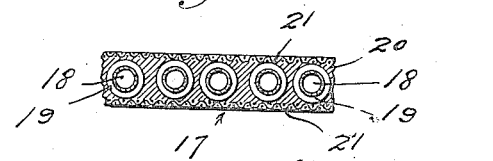
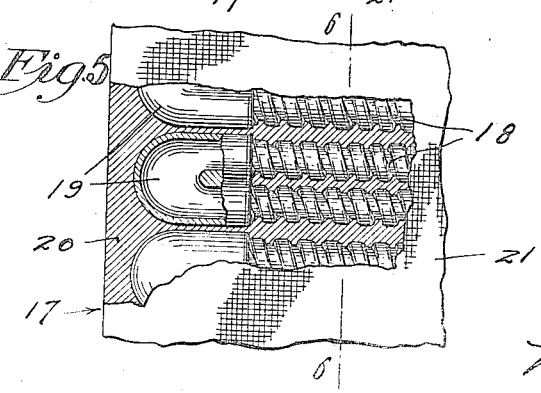
Inventor
Paul E. Hawkinson
By his Attorneys
Merchant, Kilgore & Kilgore

UNITED STATES PATENT OFFICE.

PAUL E. HAWKINSON, OF MINNEAPOLIS, MINNESOTA.

PROCESS AND APPARATUS FOR VULCANIZING TIRES.

1,397,209.    Specification of Letters Patent.    Patented Nov. 15, 1921.

Application filed January 27, 1921. Serial No. 440,427.

*To all whom it may concern:*

Be it known that I, PAUL E. HAWKINSON, a citizen of the United States, residing at Minneapolis, in the county of Hennepin and State of Minnesota, have invented certain new and useful Improvements in Processes and Apparatus for Vulcanizing Tires; and I do hereby declare the following to be a full, clear, and exact description of the invention, such as will enable others skilled in the art to which it appertains to make and use the same.

My present invention relates to an improved process and aparatus for vulcanizing tires. The invention is intended for general use, but is especially adapted for use in repairing large pneumatic tires, which, owing to their thickness, should have heat applied both from the outside and the inside to properly cure the raw gum. It has been found that if heat is applied entirely from the outside, the result is that the gum is over cured which, of course, is detrimental. It is now the custom in vulcanizing large tires to confine the portion thereof, to be repaired, in an unyielding mold into which steam, under the desired pressure, is turned to furnish the required degree of heat to cure the raw gum from the outside of the tire. During this curing of the gum from the outside, the tire is pressed against the mold by placing therein, a flexible expansible pneumatic bag which is inflated to the desired pressure from a compressor or other suitable source of supply. After the gum is properly cured on the outside or tread of the tire, the steam is turned off from the mold and turned into the bag, after a valve in said bag has been opened to allow the steam to force the air from the bag. The steam pressure must be considerably less than the air pressure, which was the desired pressure, for the reason that steam under this pressure would be too hot for properly curing the gum. The reducing of the pressure in the bag, when substituting steam for air, is highly objectionable for the reason, that when the pressure is reduced, the raw gum will expand causing it to become porous and at the same time, pulls away from the tire. It will thus be seen that it is impossible to use steam as a common medium to supply the desired pressure within a tire, and the required degree of heat to properly cure the gum for the reason that when the proper pressure is applied the heat will be too great and when the proper degree of heat is applied, the pressure will not be sufficient.

The object of my invention is to overcome this difficulty and provide means whereby a tire may be vulcanized by simultaneously applying the desired degree of heat, both on the outside and the inside of the tire and, at the same time, applying within a tire, a continuous and required pressure that is entirely independent of the heating medium.

To the above ends, generally stated, the invention consists of the novel devices and combinations of devices hereinafter described and defined in the claims.

Referring to the drawings:—

Figure 1 is a fragmentary elevation of a vulcanizing apparatus having the invention incorporated thereon;

Fig. 2 is a transverse section taken through the mold, on an enlarged scale;

Fig. 3 is an enlarged side elevation of the heating hammock and pneumatic bag removed from the tire with some parts broken away;

Fig. 4 is a plan view of the heating hammock spread out flat with some parts broken away and sectioned;

Fig. 5 is a fragmentary detail view of the heating hammock with some parts broken away and sectioned; and Fig. 6 is a transverse section taken on the line 6—6 of Fig. 5.

The numeral 7 indicates a cast mold having a steam chamber 8, a segmental tire receiving channel 9 in which is removably mounted, a pair of segmental bead irons 10 connected to nut-equipped bolts 11. A pneumatic tire 12 is shown mounted in the mold 7, and which mold is supported on a bench 13. Steam is supplied to the chamber 8 from a boiler 14 through a valve-equipped main pipe 15 and a return pipe from said mold to the boiler is indicated by the numeral 16. The parts thus far described are of standard and well known construction.

Referring now, in detail, to the invention, the numeral 17 indicates a flexible heating hammock adapted to be placed within a tire and closely fits against the inner wall thereof and extends from one bead to the other. This hammock 17, as shown, includes a manifold made up of flexible steel tubes 18, closely positioned in parallel arrangement and having their ends connected by U-shaped couplings 19. This manifold is embedded in a filler 20 of gum or other suitable material and held within a casing 21 made up of inner and outer fabric sheets. At the longitudinal edges of the hammock 17, the gum and fabric are extended outward of the manifold and brought to sharp edges which terminate at the beads of the tire, as shown in Fig. 2.

One end of the manifold to wit: the receiving end is extended outward of the casing 21 and connected to the main steam pipe 15 by a cut-off valve-equipped coupling 22. The other end of the manifold is also extended outward of the casing 21 and provided with a pet cock 23 permitting the manifold to be opened to the atmosphere. Held within the heating hammock 17 is an expansive pneumatic bag 24 having a check valve-equipped stem 25 adapted to be attached to a hose leading from an air compressor or other suitable source, not shown, from which the bag 24 may be inflated to the desired pressure.

From the above description, it is evident that by turning steam into the chamber 8 from the boiler 14 which is kept at the desired pressure, the gum in the tire may be properly cured, both from the outside and the inside of the tire. By opening the pet cock 23 to a greater or less extent, a constant supply of steam may be caused to flow therethrough and carry away any condensation which may take place within the manifold. While the tire is being vulcanized the tread of the tire is held against the mold 7 and the heating hammock 17 held against the inner wall of the tire under a constant and required pressure. One of the purposes of embedding the manifold within a pliable body is to make the outer face of the heating hammock smooth so that it will keep the inner wall of the tire smooth under the pressure of the bag 24. By simultaneously vulcanizing the tire both from the outer side and the inside, half of the time is saved over the method now used and previously referred to.

The pneumatic expansible bag, in a broad sense, is a core and it is, of course, understood that any kind of expansible core, or in fact a solid core, may be used in place thereof.

What I claim is:—

1. The process of vulcanizing tires consisting in confining a tire in an unyielding mold, applying a heating hammock within the tire, placing an expansible pneumatic bag in the hammock, and applying heat to the hammock.

2. The process of vulcanizing tires consisting in confining a tire in an unyielding mold, applying a heating hammock within the tire, placing an expansible pneumatic bag in the hammock, and applying heat to the mold and hammock.

3. In an apparatus for vulcanizing tires, the combination with an unyielding mold and means for confining a tire therein, of a heating hammock adapted to be applied in a tire, an inflatable pneumatic bag adapted to be placed in the hammock, and means for supplying heat to the hammock.

4. In an apparatus for vulcanizing tires, the combination with an unyielding mold and means for confining a tire therein, of a heating hammock adapted to be applied in a tire, an inflatable pneumatic bag adapted to be placed in the hammock, and means for supplying heat to the mold and hammock.

5. In an apparatus for vulcanizing tires, the combination with an unyielding mold and means for confining a tire therein, of a heating hammock having a flexible manifold adapted to be applied in a tire, an inflatable pneumatic bag adapted to be placed in the hammock, and means for supplying heat to the manifold.

6. In an apparatus for vulcanizing tires, the combination with an unyielding mold having a heating chamber, and means for confining a tire in the mold, of a heating hammock having a flexible manifold adapted to be applied in a tire, an inflatable pneumatic bag adapted to be placed in the hammock, and means for supplying steam to the heating chamber of the mold and the manifold.

7. In an apparatus for vulcanizing tires, the combination with an unyielding mold having a heating chamber, and means for confining a tire in the mold, of a heating hammock having a manifold adapted to be applied in a tire, an inflatable pneumatic bag adapted to be placed in the hammock, and means for supplying steam to the heating chamber of the mold and the manifold.

8. In an apparatus for vulcanizing tires, the combination with an unyielding mold having a steam chamber, a steam supply pipe leading to the chamber in the mold and means for confining a tire in the mold, of a heating hammock adapted to be applied in a tire, said hammock having a flexible manifold, a steam supply pipe connected to one end of the manifold, a valve on the other end of the manifold, and an inflatable pneumatic bag adapted to be placed in the chamber.

9. The process of vulcanizing tires consisting in confining a tire in a mold, applying a heating hammock within the tire, placing a core in the hammock, and applying heat to the hammock.

10. The process of vulcanizing tires consisting in confining a tire in a mold, applying a heating hammock within the tire, placing a core in the hammock, and applying heat to the mold and hammock.

11. In an apparatus for vulcanizing tires, the combination with a mold and means for confining a tire therein, of a heating hammock adapted to be applied in a tire, a core adapted to be placed in the hammock, and means for supplying heat to the hammock.

12. In an apparatus for vulcanizing tires, the combination with a mold and means for confining a tire therein, of a heating hammock adapted to be applied in a tire, a core adapted to be placed in the hammock, and means for supplying heat to the mold and hammock.

13. In an apparatus for vulcanizing tires, the combination with a mold and means for confining a tire therein, of a heating hammock having a flexible manifold adapted to be applied in a tire, a core adapted to be placed in the hammock, and means for supplying heat to the manifold.

14. In an apparatus for vulcanizing tires, the combination with a mold having a heating chamber, and means for confining a tire in the mold, of a heating hammock having a flexible manifold adapted to be applied in a tire, a core adapted to be placed in the hammock, and means for supplying steam to the heating chamber of the mold and the manifold.

15. In an apparatus for vulcanizing tires, the combination with a mold having a heating chamber and means for confining a tire in the mold, of a heating hammock having a manifold adapted to be applied in a tire, a core adapted to be placed in the hammock, and means for supplying steam to the heating chamber of the mold and the manifold.

16. In an apparatus for vulcanizing tires, the combination with a mold having a steam chamber, a steam supply pipe leading to the chamber in the mold and means for confining a tire in the mold, of a heating hammock adapted to be applied in a tire, said hammock having a flexible manifold, a steam supply pipe connected to one end of the manifold, a valve on the other end of the manifold, and a core adapted to be placed in the chamber.

In testimony whereof I affix my signature.

PAUL E. HAWKINSON.